United States Patent [19]
Grotloh

[11] 3,814,375
[45] June 4, 1974

[54] SHUT-OFF VALVE AND CONTROL SYSTEM THEREFOR

[75] Inventor: Karlheinz Grotloh, Winterthur, Switzerland

[73] Assignee: Sulzer Brothers Ltd., Winterthur, Switzerland

[22] Filed: Aug. 16, 1971

[21] Appl. No.: 172,092

[30] Foreign Application Priority Data
Sept. 1, 1970 Switzerland.................... 13021/70

[52] U.S. Cl.................................... 251/28, 251/31
[51] Int. Cl........................................ F16k 31/143
[58] Field of Search................... 251/26, 28, 29, 31

[56] References Cited
UNITED STATES PATENTS
2,334,826 11/1943 Lowe.............................. 251/28 X
2,622,617 12/1952 Sederquist........................ 251/31 X
2,937,846 5/1960 Hannant et al...................... 251/29

Primary Examiner—Arnold Rosenthal
Attorney, Agent, or Firm—Kenyon & Kenyon Reilly Carr & Chapin

[57] ABSTRACT

The valve is controlled over a servo-motor by the pressure of the working medium in the valve. The flow through the bleed line is passed either above or below the servo-piston to aid in the closing or opening of the valve. The control unit of the control system is mounted in the cover of the valve. Upon interruption of the signal lines, the valve closure member automatically moves into a safe position.

6 Claims, 3 Drawing Figures

SHUT-OFF VALVE AND CONTROL SYSTEM THEREFOR

This invention relates to a valve and particularly to a shut-off valve and to a control system therefor.

Valves, and especially shut-off valves, have been utilized in a multitude of environments for various purposes. However, when used in environments, such as in nuclear reactors, which require the control lines for the operation of the valves to be disposed in a protective manner so as not to be influenced by external conditions which might cause leakage or even destruction of the control lines, the expense and construction of the valves have been burdensome.

Accordingly, it is an object of the invention to provide a valve with internal control lines for the operation of the valve.

It is another object of the invention to prevent the control lines of a shut-off valve from being influenced by external conditions which might cause leakages or destruction of the control lines.

It is another object of the invention to permit safe operation of a valve.

It is another object of the invention to automatically close a valve in response to a leak in the control system for the valve.

It is another object of the invention to provide a reliable relatively low cost fail safe valve.

Briefly, the invention provides a valve having a valve body and a valve closure member which is operated by a servo-motor actuated by a working medium passing through the valve, and a control system having a control unit for controlling the working medium which is diverted from the valve and a safety system which actuates the control unit.

The control unit communicates over a bleed line with the interior of the valve body to carry off the diverted working medium. The control unit also communicates over a pair of control lines with the servo-motor. The servo-motor and the valve body are arranged so that the bleed line and the control lines are formed as ducts in the valve body and/or in a part combined with the valve body which ducts extend to a surface to which the control unit is attached. The safety system communicates with the control unit over signal lines and acts as a higher authority so as to deliver suitable signals to the control unit to open or close the valve.

In the event of an interruption in one of the signal lines, the valve closure member either obeys the safety system or automatically moves into a predetermined safe position for the plant of which the valve forms a part. Also, if the control lines start to leak or are destroyed, the closure member either obeys the signals of the safety system or moves to a safe, usually the closed, position.

Conveniently, the valve body has a cover having at least one recess for receiving the control unit. This feature provides simple but effective protection for the control unit.

The valve closure member, a guide for the valve closure member, and the piston of the servo-motor may be situated on the valve cover and may form, with the control unit, a unit which can be attached to the valve body. This feature simplifies and reduces the size of the valve construction.

These and other objects and advantages of the invention will become more apparent from the following detailed description and appended claims taken in conjunction with the accompanying drawings in which:

FIG. 1 diagrammatically illustrates a valve and control system of the invention;

Figure 1:
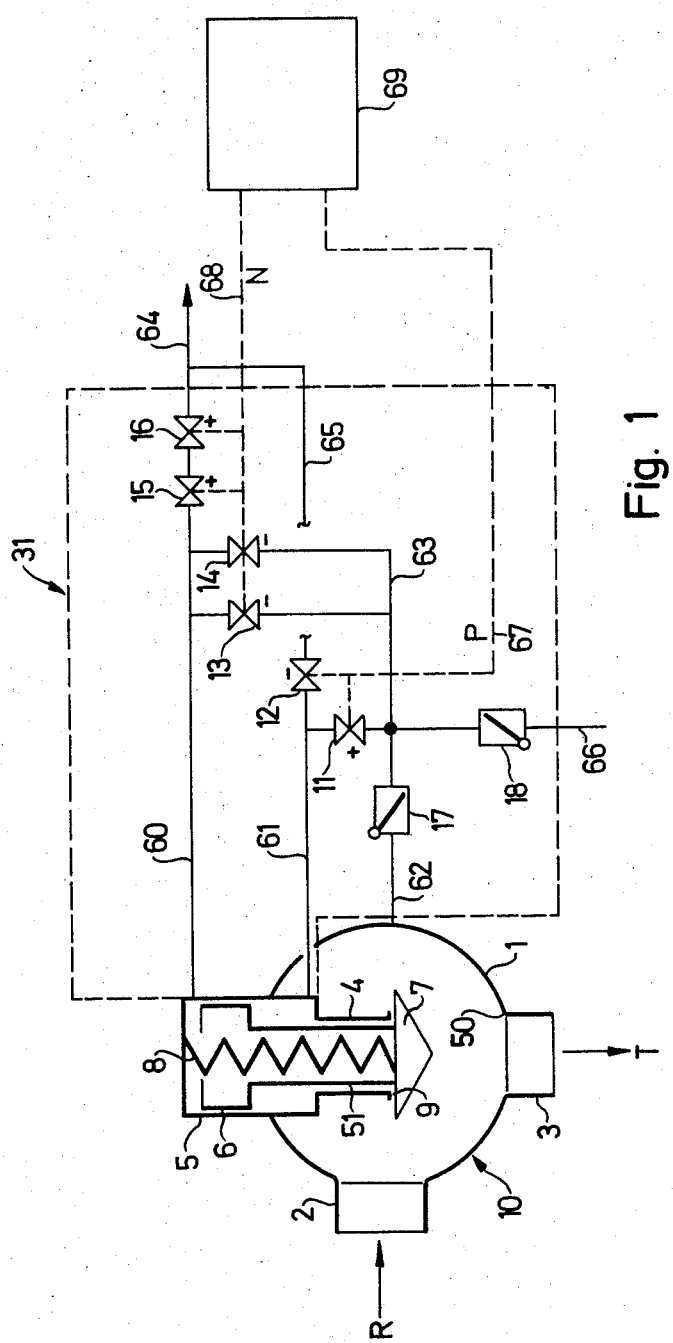

Referring to FIG. 1, a valve 10 has a part-spherical body 1 which is provided with spigots 2 and 3. The body 1 is connected by the spigot 2 to a nuclear reactor R (not shown) which may be a boiling water reactor. The spigot 3 extends, for example, through the wall of the containment of the nuclear reactor to a turbine T (not shown). Situated within the body 1 is a valve closure member 7 which is arranged to co-operate with a valve seat 50 and which has a stem 51 movable within a guide 4. The stem 51 which forms a servo-piston 6 in a cylinder 5 is hollow and contains a compression spring 8 which bears against the end of the servo-cylinder 5 and urges the valve closure member 7 in a closing direction. In addition, a back seat 9 is formed between the guide 4 and the valve closure member 7.

A control unit 31 is connected to the servo-motor formed by the servo-cylinder 5 and servo-piston 6 over control lines 60, 61 which lead from the servo-cylinder 5, one line being above and the other below the piston 6. These lines 60, 61 supply and remove the medium for operating the piston 6. The control unit 31 also connects over a bleed line 62 to the valve 10. This bleed line 62 contains a check valve 17 and communicates with the control lines 60, 61 over control valves 11, 13, respectively. An additional control valve 14 which is parallel with the control valve 13 is situated in a control line 63 for safety reasons and also connects the bleed line 62 to the control line 60. A discharge line 64 extends from the junction between the two control lines 63, 60 which for safety reasons also contains two control valves 15, 16. The control line 61 is connected to the discharge line 64 via a control 65 including a control valve 12. Joining the line 62 between the check valve 17 and the control line 63 is a line 66 which contains a check valve 18 and which can be connected to a source of an external medium such as a pressurized nitrogen cylinder. This latter feature ensures that actuating medium is available at an adequate pressure even though the pressure of the medium in the valve body 10 may be too low, for example, when the plant is shut down or starting up.

The valves 11, 12 are connected to a signal line 67 which transmits a signal P, and the valves 13 to 16 are connected to a signal line 68 which transmits a signal N. The signal lines 67, 68 are, in turn, connected to a safety system 69 (shown as a block) which can be a 2-out-of-3 safety circuit or a computer or a control room with human invigilation or safety switch for emitting the signals N, P to the control unit 31. The valves 11, 12 are so connected to the line 67 that when there is a positive P signal, the valve 11 is open and the valve 12 is closed. When N is positive, the valves 15, 16 are open and the valves 13, 14 are closed. In FIG. 1, a plus sign denotes the open position and a minus sign denotes the closed position. Consequently, when P is positive, medium flows from the valve 10 through the bleed line 62 and the control line 61 into the part of the cylinder 5 below the servo-piston 6. As a result, the piston 6 moves upwards, as viewed, displacing medium from the part of the cylinder 5 above the piston 6 through the lines 60 and 64. The valve closure member 7 thus opens rapidly against the force of the spring 8.

When the valve 10 is open, the pressure of the working-medium in the body 1 acts on the closure member 7. The resulting force is greater than the force of the spring 8, so that the force acting in the part of the cylinder 5 below the servo-piston 6 can be reduced. This is done by opening the valve 12 and closing valve 11, although the closure member 7 of the valve 10 remains in its open position despite this changeover. In order to change the valves 11, 12 over, the positive signal P ceases—i.e., is reduced to zero or interrupted. The advantage of this position is that when the valve 10 is open, medium cannot overflow along the generated surface of the piston 6 nor, since the closure member 7 has the back seal 9, can the medium overflow into the part of the cylinder 5 below the piston 6.

In order to close the valve 10, the signal N is reduced to zero or switched off, so that the valves 13, 14 open and the valves 15, 16 close. Medium then passes along the lines 62, 63 into the control line 60 and, therefore, into the part of the cylinder 5 above the piston 6. The chamber below the piston 6 is unpressurized at this time because the signal P is zero. Consequently, the full pressure of the medium, plus the force of the spring 8, combine to lower the closure member 7 rapidly to close the valve 10.

So that working medium cannot escape from the part of the cylinder 5 above the piston 6 to the part of the cylinder 5 below the piston 6 when the valve 10 is closed, the signal P can restart. Thus, the valve 11 opens and valve 12 closes to give the same working medium pressure on both sides of the piston 6.

Figure 2:
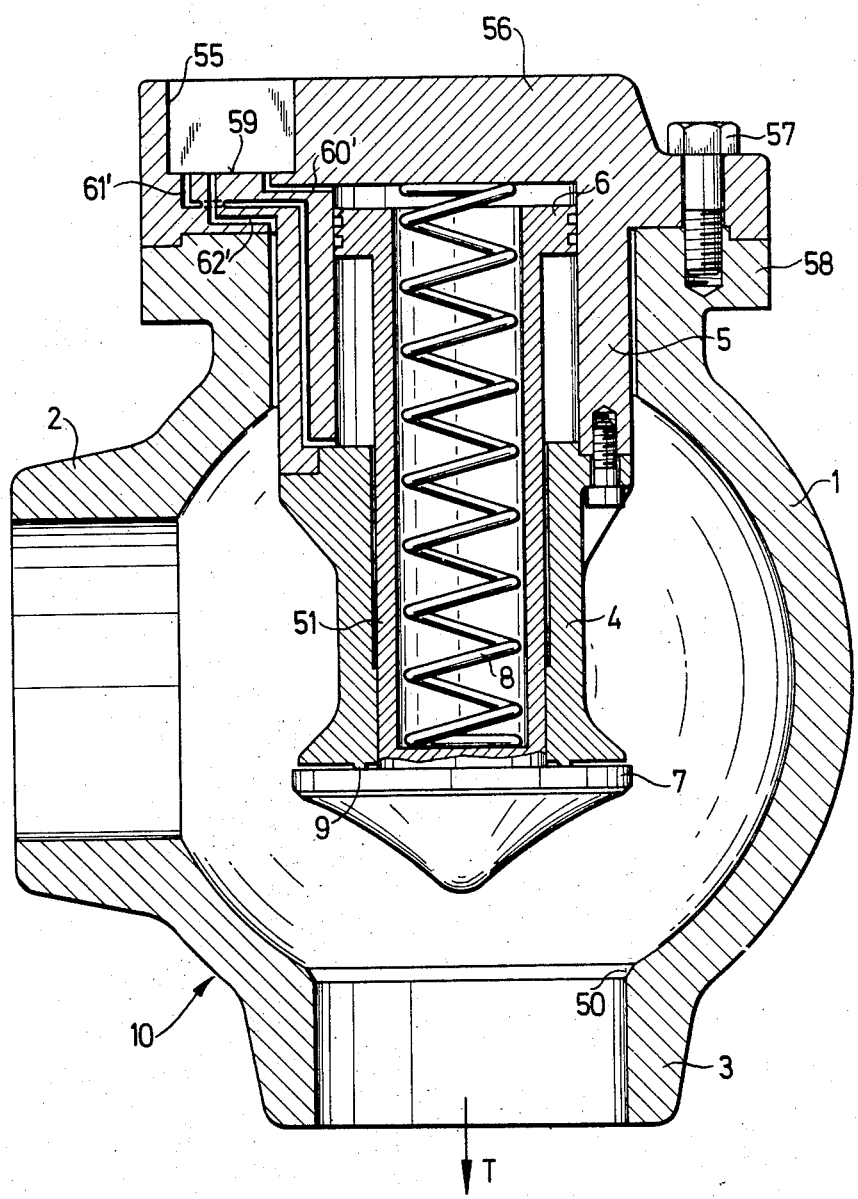
FIG. 2 illustrates a sectional view through the valve of FIG. 1.

Referring to FIG. 2 wherein like reference characters indicate like parts as above, in one particular embodiment, the control unit 31 is received within a recess 55 in the valve body cover 56 and the servo-cylinder 5 is formed in one piece with a cover 56 which is secured by screws 57 to a flange 58 on the body. The guide 4 for the stem 51 of the closure member 7 is provided at the bottom end of the cylinder 5. Starting from the lower peripheral surface 59 of the recess 55 to which the control unit 31 is attached, the control line 60 of FIG. 1 continues as a duct 60' through the cover 56 to the part of the cylinder above the servo-piston 6. A duct 61' corresponding to the control line 61 extends from the surface 59 to the part of the cylinder below the servo-piston 6. A duct 62' corresponding to the bleed line 62 extends from the surface 59 to the place where the cover 56 merges into the servo-cylinder 5, the cylinder 5 having a smaller outer diameter than the surrounding cylindrical valve body 1. An annular gap is therefore formed through which the medium for operating the servo-piston 6 is supplied.

Figure 3:
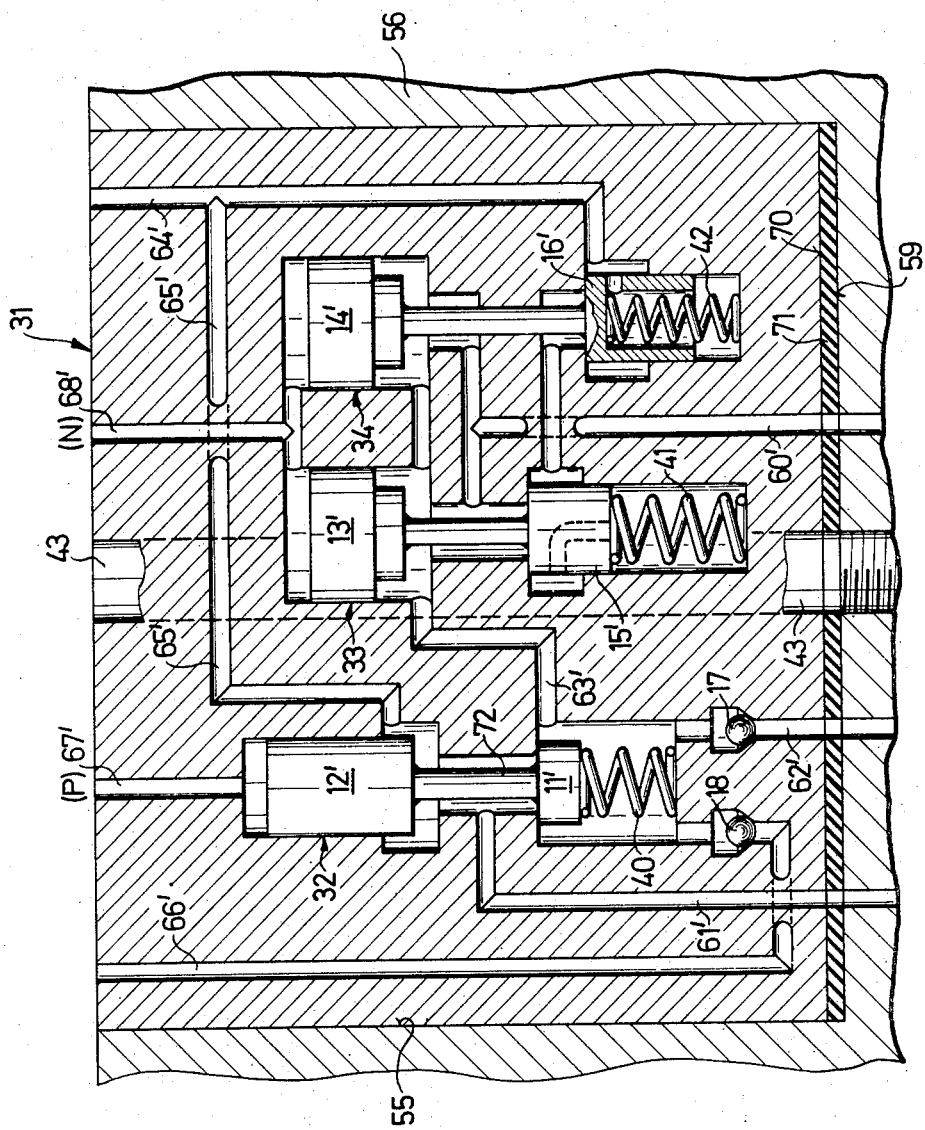
FIG. 3 illustrates a cross-sectional view to a larger scale than FIG. 2 of part of the valve cover and control unit according to the invention.

Referring now to FIG. 3, the control unit 31 is secured by a tensioning screw (not shown) extending through a central aperture 43 within the recess 55 with the bottom end face 70 resting against a flat seal 71 on the lower peripheral surface 59 of the recess 55. The ducts 60', 61', 62' are continued into the control unit 31. The valves 11, 12 of FIG. 1 are embodied in the unit 31 as a double valve 32, a closure member 11' and a piston 12' interconnected by a rod 72. The closure member 11' bears on a spring 40 received in a chamber to which extend the bleed duct 62' and a supply duct 66' for the working medium. Ball-type check valves 17, 18 are provided in the two ducts 62', 66' respectively. The valves 13 and 15 are combined in the control unit 31 to form a double valve 33, and the valves 14 and 16 are combined in the unit 31 to form a double valve 34. The closure members 15', 16' bear on springs 41, 42 respectively. The signal P of signal line 67, whose connection to duct 67' is not shown, acts on the top of piston 12', and the signal N of signal line 68 acts on the top of pistons 13' and 14'. If signal P is positive — i.e., if the duct 67' is pressurized piston 12' is forced down and the closure member 11' places the bleed duct 62' in communication with the control duct 61'. In this way, medium is supplied to the part of the cylinder below the piston 6. If signal N is positive — i.e., if duct 68' is pressurized — both the pistons 13' and 14' are forced down, so that the duct 63' is closed while the closure members 15', 16' place the part of the cylinder above piston 6 in communication, via duct 60', with the discharge duct 64'.

If the signal P is zero, the spring 40 forces the closure member 11' up to interrupt the communication between the bleed duct 62' and the control duct 61'. The control duct 61' then communicates via the duct 65' with the discharge duct 64'. Since the signal N is zero, the springs 41, 42 force up the closure members 15', 16' respectively so that these closure members 15', 16' interrupt the communication between the control duct 60' and the discharge duct 64'. Also, the pistons 13', 14' establish communication via the duct 63' between the bleed duct 62' and the control duct 60' so that the medium now reaches the part of the cylinder above the servo-piston 6.

Thus, should one or all of the signal lines connected to the top of the control unit 31 be destroyed, the valve closure member 7 cannot move wrongly — i.e., it fails safe. For instance, if, starting from the control valve position shown in FIG. 1, the signal line 67 starts to leak, the signal P drops to zero, so that valve 12 opens and valve 11 closes. The part of the cylinder above the servo-piston 6, therefore, ceases to be pressurized, but the closure member 7 remains in its top position, as viewed, because the pressure in the valve body 1 keeps the member 7 in its top position.

If, on the other hand, and starting as in the previous case from the position shown in FIG 1, signal line 68 starts to leak, the signal N drops to zero so that valves 13, 14 open and valves 15, 16 close. The closure member 7 would, in these circumstances, be moved slowly by spring 8 into the closed position, since the forces acting in opposite directions on the servo-piston 6 and the closure member 7 are approximately the same.

Closure also occurs in the event (starting from the position shown in FIG. 1) of the two signals line 67 and 68 starting to leak, for all six control valves would change their position, causing rapid closure of the valve 10.

In a modification, two or more control units are received in the recess 55, one unit containing the double valve 32 and the other unit containing the double valves 33, 34. If there is a subdivision into more than two control units, each individual double valve 33, 34 can be situated in a separate unit. If there is a subdivision into two or more control units, a special recess can be provided for each control unit.

In a further modification, the control lines 60' and 61' and the bleed duct 62' can be situated in a special valve part assembled together with the valve body 1, for instance, in a flat ring part situated between the flange 58 and cover 56, in which event the servo-cylinder can be unitary with the ring part instead of with the cover 56.

What is claimed is:

1. In combination, a valve having a valve body and a valve closure member;

a servo-motor mounted within said valve body and connected to said closure member for moving said closure member within said body;

a control unit for controlling a flow of working medium from said valve body to said servo-motor;

a bleed line between said valve body and said control unit for directing working medium from said valve body to said control unit;

a pair of control lines between said control unit and said servo-motor for selectively directing the working medium from said bleed line into said servo-motor to control the direction of movement of said closure member;

said bleed line and said control lines being disposed as ducts in said valve body;

a safety system having signal lines connected to said control unit for emitting signals to said control unit for actuating said control unit; and means in said control unit for moving said closure valve member into a predetermined position in response to an interruption in the emission of a signal in at least one of said signal lines.

2. The combination as set forth in claim 1 wherein said valve body has a cover including at least one recess therein receiving said control unit therein.

3. The combination as set forth in claim 1 wherein said servo-motor includes a servo-cylinder disposed in said valve body in spaced annular relation to define an annular gap there-between, said gap communicating the interior of said valve body with said bleed line.

4. The combination as set forth in claim 1 which further includes a guide for said valve closure member, a piston in said servo-motor connected to said valve closure member and a cover secured to said valve body, said closure member, guide, piston, control unit and cover forming unit secured to said valve body.

5. In combination, a valve having a valve body, a cover mounted on said body and a valve closure member;

a servo-motor connected to said closure member for moving said closure member within said body;

a control unit received within said cover for controlling a flow of working medium from said valve body to said servo-motor;

a bleed line between said valve body and said control unit for directing working medium from said valve body to said control unit;

a pair of control lines between said control unit and said servo-motor for selectively directing the working medium from said bleed line into said servo-motor to control the direction of movement of said closure member;

said bleed line and said control lines being disposed as ducts in said valve body;

a safety system having signal lines connected to said control unit for emitting signals to said control unit for actuating said control unit; and means in said control unit for moving said closure valve member into a predetermined position in response to an interruption in the emission of a signal in at least one of said signal lines.

6. In combination, a valve having a valve body and a valve closure member;

a servo-motor connected to said closure member for moving said closure member within said body;

a control unit received within said valve body for controlling a flow of working medium from said valve body to said servo-motor;

a bleed line between said valve body and said control unit for directing working medium from said valve body to said control unit;

a pair of control lines between said control unit and said servo-motor for selectively directing the working medium from said bleed line into said servo-motor to control the direction of movement of said closure member;

said bleed line and said control lines being disposed as ducts in said valve body;

a safety system having signal lines connected to said control unit for emitting signals to said control unit for actuating said control unit; and means in said control unit for moving said closure valve member into a predetermined position in response to an interruption in the emission of a signal in at least one of said signal lines.

* * * * *